United States Patent [19]

Launay

[11] 4,368,684

[45] Jan. 18, 1983

[54] DIE ASSEMBLY FOR DECORATING PASTRIES AND DESSERTS

[75] Inventor: Noël Launay, Beauvais, France

[73] Assignee: Societe d'Assistance Technique pour Produits Nestle S.A., Lausanne, Switzerland

[21] Appl. No.: 264,063

[22] Filed: May 15, 1981

[30] Foreign Application Priority Data

May 19, 1980 [FR] France .............................. 80 11125

[51] Int. Cl.³ .............................................. B05C 5/02
[52] U.S. Cl. ...................................... 118/25; 118/411
[58] Field of Search ...................... 118/24, 25, 411, 14

[56] References Cited

U.S. PATENT DOCUMENTS 3,547,052 12/1970 Artiaga et al. ..................... 118/25 X
3,878,992 4/1975 MacManus ....................... 118/24 X Primary Examiner—John P. McIntosh
Attorney, Agent, or Firm—Vogt & O'Donnell

[57] ABSTRACT

A distributing head enables the upper and lateral faces of an article (2), particularly of confectionery, and particularly pseudo-parallelepipedic in shape, resting on a platform acting as a support to be simultaneously coated and decorated with an aerated product of semi-fluid consistency.

9 Claims, 5 Drawing Figures

DIE ASSEMBLY FOR DECORATING PASTRIES AND DESSERTS

This invention relates to a head for coating and decorating confectionery articles or desserts.

More particularly the invention relates to a head for distributing a food product of an aerated semifluid type, such as meringue mix, onto a confectionery article or dessert and for decorating by means of this product the article which has been coated and covered therewith. The distributing and decorating head according to the invention is intended in particular for the preparation of Baked Alaskas which are parallelepipedic, rectangular or pseudo-parallelepipedic in shape.

It is known that there are already different types of machines for topping other than manually, in general mechanically round or cylindrical articles of food with semifluid products. For example, in the particular case of factory-made pizzas, there are numerous apparatus for automatically topping and upper surface of the pizzas and for metering the volume of the topping which may be formed for example by sauces, pastes or fillings of different consistency. However, all these known apparatus, although generally performing the function for which they were designed in a satisfactory manner, remain limited on the one hand to products that are circular in shape and on the other hand to the topping, coating or decoration of their upper surface only. In the more particular case of coating and decorating confectionery articles or similar articles, such as ice cream, it is known that there are coating heads for applying the decorative product either to only the lateral face of gateaus or similar cylindrical articles or simultaneously to the lateral face of such an article and to the upper transverse face thereof. To this end, the distributing head, according to the circumstances, is either a fixed nozzle provided with a vertical slot for expelling the decorative product onto the lateral face of the cylindrical gateau rotated about its axis, said lateral face thus moving past the slot through which the product used for coating and decoration is extruded, or by an assembly preferably comprising a distributing head for coating and/or decorating the upper surface of a cylindrical article associated with an auxiliary head comprising at least one horizontal nozzle through which the decorative product is extruded onto the side of said article, the two heads being designed to be controlled in such a way that the nozzles with which they are provided either extrude the product simultaneously onto the upper surface and the sides or extrude it independently of one another. Once again, the existing apparatus, although enabling both the upper surface and also the lateral surface of a confectionery article to be coated and/or decorated, only achieve this result for round, particularly cylindrical, articles but not for articles of any other geometrical shape.

Certain confectionery articles, gateaus or the like, are traditionally parallelepipedic in shape, as is the case in particular with the article known as a Baked Alaska which assume the general form of a rectangular parallelepiped or a pseudo-parallelepipedic form very similar thereto. No apparatus of the type known at the present time has been found to be capable of handling articles and products of this shape.

The present invention overcomes the above-mentioned disadvantages by providing a head for simultaneously coating and decorating, with an aerated product of semifluid consistency, the upper surface and the lateral surfaces of a confectionery article of which the upper surface has a rounded or polygonal contour and of which the lateral surfaces define a surface depending from the upper surface, particularly pseudo-parallelepipedic in shape, and which is arranged on a platform serving as a support, making it possible to coat with meringue mix the faces of the pseudo-parallelepipedic core of ice cream which is a component of a Baked Alaska.

The coating and decorating head according to the invention is arranged on a platform serving as a support and comprises a chamber for storing said aerated product the base of which closely follows the contour of the upper face of the article to be coated, the chamber having an opening through which it communicates with a metering unit which is itself connected to a source of supply of said aerated product, and two groups of vertical nozzles provided in the said base for simultaneously dispensing said product, the nozzles being arranged in such a way that they completely surround the article to be coated, the nozzles of the first group (the upper decorating nozzles) being distributed at regular intervals over the entire surface of the base and having a lower serrated outlet opening, the nozzles of the second group (the lateral decorating nozzles), which are longer than those of the first group, being arranged at regular intervals along the periphery of the base and having a lateral opening directed inwards parallel to the contour of the base, except for nozzles situated at the tops of the polygon in the case of a polygonal contour in which case the lateral opening is in a plane perpendicular to the plane of symmetry of the two sides of which it forms the intersection, and the said coating head and the support for the article being moveable vertically relative to one another on completion of dispensing the product.

It will readily be appreciated that the nozzles have to surround the article completely. Thus, difference in level between the lower orifices of each of the nozzles of the first group and of each of the nozzles of the second group has to be at least equal to the height of the article to be covered before it is covered. In addition, the peripheral nozzles of the second group have to be arranged in such a way that two nozzles situated opposite one another are separated from one another by a distance at least equal to the distance between the two corresponding faces of the article after they have been covered.

The coating and decorating head according to the invention is preferably kept fixed whilst the support for the article to be coated is moveable vertically downwards after the product serving as coating has been extruded onto the upper and lateral faces of said article.

In one particularly advantageous embodiment, the peripheral nozzles have a lateral outlet opening bevelled in the form of a whistle.

To enable the lateral faces of the article for coating to be decorated in a rib-like pattern, the bevelled lateral outlet openings of two successive nozzles have different dimensions.

Reference will be made hereinafter to an article of pseudo-parallelepipedic shape. It is clear that the two groups of nozzles of the head according to the invention may be so arranged as to surround an article of any simple geometric form, round or otherwise, of which the upper face is flat and may have a rounded or polygonal contour whilst its lateral faces define a surface depending from the upper face.

The features and advantages of the present invention will become more clearly apparent from the following description given by way of non-limiting example in conjunction with the accompanying drawings, in which.

In these Figures, the same reference denote the same elements.

Figure 4A:
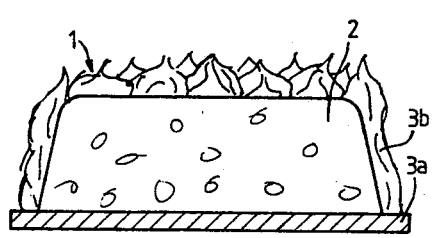
FIGS. 4a and 4b are respectively a longitudinal section and a transverse section through a Baked Alaska showing the composition thereof.
Figure 4B:
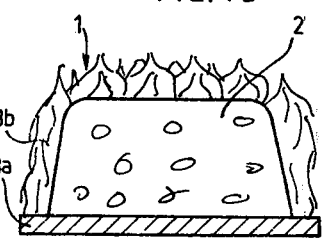

Referring first to FIGS. 4a and 4b, it can be seen that a Baked Alaska 1 consists essentially of a core or centre 2 of ice cream resting on a rectangular base 3a formed by a thermally insulating pastry, generally sponge-cake. The ice cream core, which is generally parallelepipedic in shape, has lateral faces which are substantially vertical but which may also be slightly inclined relative to the vertical and of which the lower edges define a rectangle congruent with and inside the rectangular insulating base 3a, this ice cream core thus leaving a rectangular border of sponge-cake around its entire base. As already known, the whole thus formed is then coated over the lateral and upper faces of the ice cream core and at the same time along the rectangular border of its support of sponge-cake with a layer 3b of meringue mix based on egg-whites whipped with sugar provided over its surface with recessed and projecting decorative patterns. This layer of meringue mix forms a thermal insulation enabling the whole thus coated and decorated to be heated for a predetermined length of time in an oven in which the meringue mix is mottled with brown markings caused by the heat along the projecting parts of the relief decorations.

Figure 1:
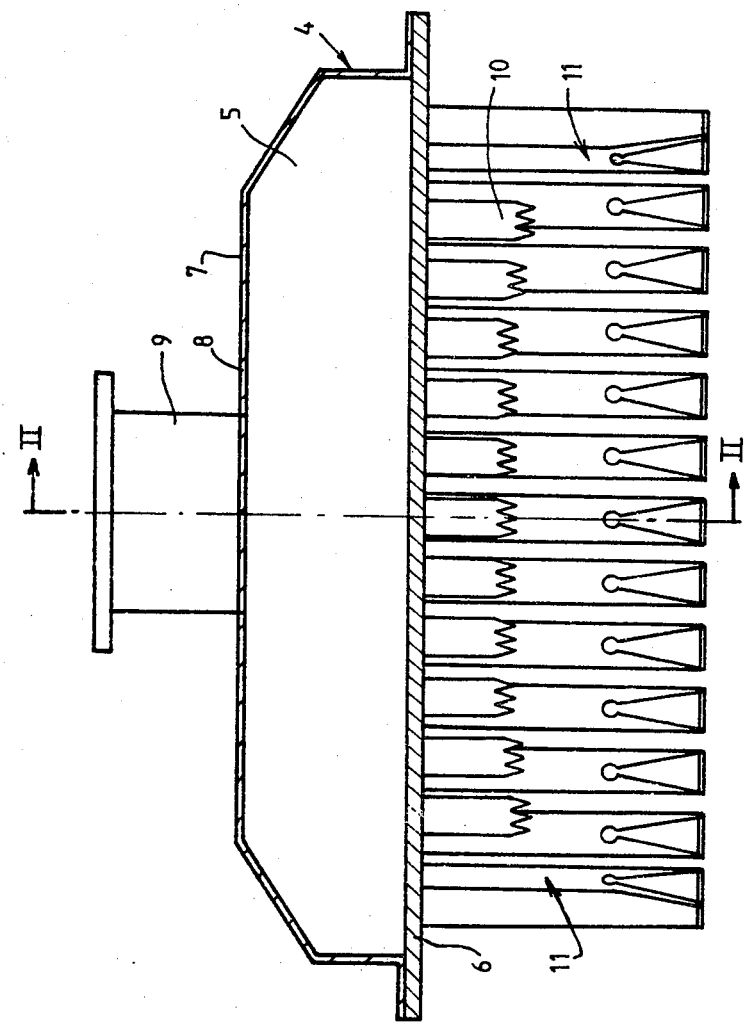
FIG. 1 is a longitudinal section through a distributing head on the line I—I in FIG. 2.
Figure 2:
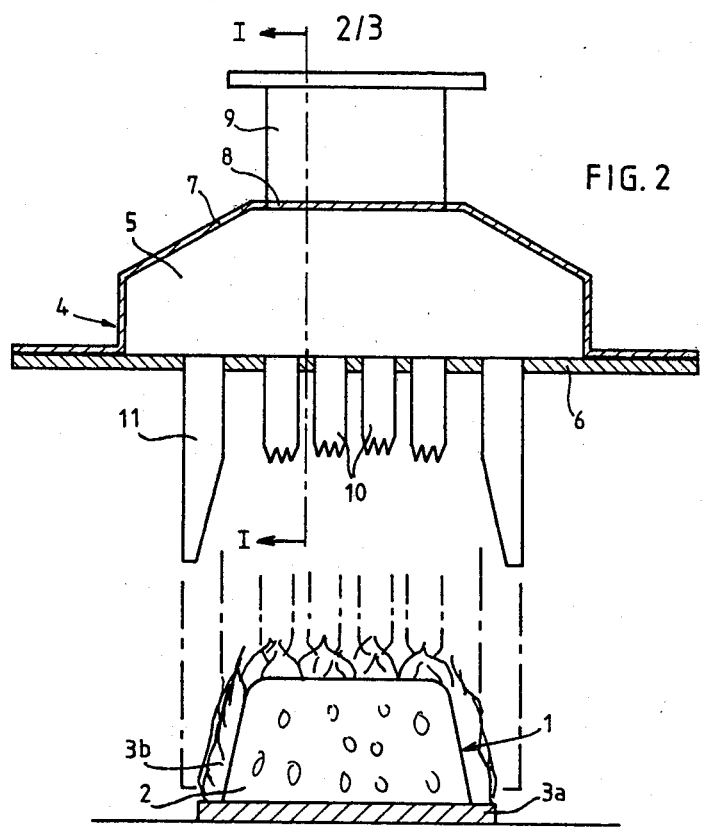
FIG. 2 is a lateral section on the line II—II through the head shown in FIG. 1.
Figure 3:
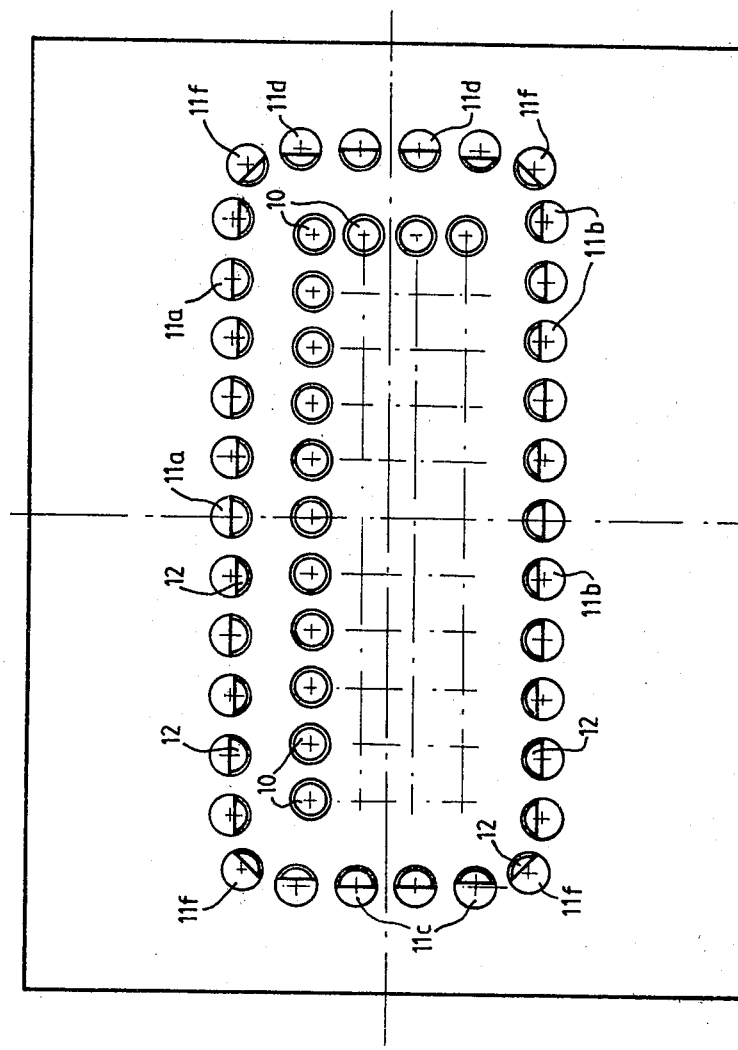
FIG. 3 is a view from below of the head shown in FIG. 1.

Referring more particularly to FIGS. 1, 2 and 3, the head or plate 4 comprises a storage chamber 5 of which the base is formed by a horizontal metal plate 6 rectangular in shape and which comprises on its upper surface 7 acting as a cover a closeable opening 8 through which said reservoir 5 communicates via a suitable pipe 9 with a metering unit (not shown) for the meringue mix fed into the reservoir which is connected to a source of supply of meringue mix (not shown) which also pressurises it. The rectangular plate 6 forming the base of the reservoir for the meringue mix also forms the support for two groups of nozzles for projecting the mix from the reservoir. The first of these groups of nozzles comprises vertical nozzles 10 disposed at regular intervals in parallel rows and columns of which each comprises the same number of elements, the centres of the inlet orifices of the nozzles of the end rows being disposed at regular intervals apart along the sides of a rectangle congruent with the rectangle forming the periphery of the base plate of the reservoir. Thus, as shown in FIG. 3, this group may comprise for example four rows of elements arranged in eleven columns. Each of these nozzles begins with an orifice formed in the base plate 6 and is formed by a tubular element having a vertical axis which opens through a lower serrated end orifice below said plate 6 and above the ice cream core, as indicated hereinafter, this orifice having any form suitable for the formation of a filament of meringue mix of which the cross-section is selected according to the characteristics of the decoration required. In most cases, the shape of this end orifice is the same as that of the end of professional or domestic piping nozzles. As shown in FIG. 3, the second group 11 of nozzles is situated outside the nozzles of the first group, its nozzles being arranged in lines on the basis on the one hand of two lines formed respectively by the nozzles 11a and 11b parallel to the rows of nozzles of the first group placed on either side of the corresponding outer nozzles thereof and, on the other hand, of two lines 11c and 11d parallel to the columns of nozzles of said first group and placed on either side of the corresponding outer nozzles thereof. In addition, this second group comprises four apex nozzles 11f each of which forms the transition nozzle between two adjacent lines extending in different directions. As in the case of the nozzles of the first group, each of these nozzles, which begins with an orifice formed in the base plate 6, is formed by a vertical tubular element which opens through a lateral orifice below said plate 6 and below the lower end orifices of the nozzles of the first group, the centres of the inlet orifices of said lateral nozzles being disposed around the periphery of a rectangle congruent with the rectangle on the periphery of which are situated the centres of the peripheral nozzles of the first group of nozzles. According to the invention, the lower end lateral outlet orifice of each of the nozzles of the second group has a whistle-like form obtained by truncating the end of said cylindrical nozzle on a plane inclined to its longitudinal axis and intersecting the plane of the circle forming the end contour of the base of the cylinder along one of its chords. The cross-section of the lateral opening thus formed may thus be selected to be adapted to the maximum or minimum fluidity of the extruded coating. In particular, the height and width of this elliptical section may be selected as desired.

Each of the lateral nozzles thus provided with an extrusion orifice in the form of a whistle is disposed in such a way that it is turned towards the inside, i.e. facing the ice cream core to be coated with meringue mix. Those nozzles which do not belong to the group of four apex nozzles 11f are disposed in such a way that the extrusion orifices of the nozzles of each of the two lines of eleven nozzles 11a and 11b parallel to the rows of eleven nozzles 10 have a vertical longitudinal plane of symmetry which runs parallel to the planes containing the axes of the nozzles of the various lines of nozzles of the first group. Similarly, the four nozzles of each of the two lines 11c and 11d parallel to the eleven columns of nozzles of the first group are disposed in such a way that the extrusion orifice of each of them has a vertical longitudinal plane of symmetry parallel to the planes containing the axes of the nozzles of the various rows of nozzles of the first group, as shown in particular in FIG. 3. The four apex nozzles 11f also have their respective extrusion orifices 12 turned towards the interior of the rectangle defined by the lateral nozzles, although each of these orifices is disposed in such a way that its vertical longitudinal plane of symmetry is inclined at 45° relative to the planes of symmetry of the extrusion orifices of each of the two nozzles which are adjacent to it and further in such a way that, in turn, it forms a plane of symmetry of those two planes together.

Whereas the lower ends of the nozzles of the second group, i.e. the peripheral nozzles, are situated at the same level, the nozzles of this group all being equal in length to that end, the lower ends of the nozzles of the first group may be situated at the same level or at different levels. In this latter case, which is preferred and which is illustrated in FIG. 1, the longest nozzles, i.e. the nozzles of which the level of the lower end is situated lowest, are opposite the periphery of this first group of nozzles whereas the most central nozzles are the shortest and hence the level of their lower ends is situated higher.

As shown in FIG. 1, the nozzles of one and the same row increase in length away from the central part of this row towards the periphery. Similarly, in one and the same column, the longest nozzles are situated at the periphery. An arrangement such as this enables the coating of the ice cream core to be given a curved form.

To ensure correct coating of the upper face and lateral faces of the ice cream core, i.e. covering of these various faces by an equal thickness or homogeneous thickness of coating product, the difference in level separating the lower part of the lowest upper nozzles from that of the peripheral nozzles is at least equal to the height of the ice cream core whilst the distance separating two lines of parallel peripheral nozzles is equal to approximately the corresponding dimension, i.e. length or width, of the ice cream core increased by two times the thickness of the layer of coating product applied on completion of coating.

The storage reservoir for the coating product is supplied with product in known manner by a metering unit of any suitable known type which, on command, introduces a predetermined quantity by weight or volume into said reservoir, this quantity being the quantity required for coating a core of ice cream or any other article of similar shape.

After ice cream core has been brought by any suitable known means into a position in which it is in line with the coating head, the operation of coating the core by means of the head as described in the foregoing is carried out by initiating a vertical displacement of the head relative to the core placed on its support. There are two ways of doing this: either the coating head remains fixed and the support for the ice cream core is moved vertically downwards by a predetermined distance or the support for the ice cream core remains fixed and the coating head is moved upwards by the same distance as in the preceding case.

Thus, in one preferred embodiment of the invention, the rectangular core of ice cream resting on its insulating sponge base is conveyed by any suitable known means, such as a pusher or conveyor belt, onto a receiving platform positioned level with the fixed coating head. The corresponding rectangle is concentric with the rectangle of said coating head and has such dimensions that its edges are disposed along the projection of the lines of lateral nozzles. When the ice cream core has been placed on its support, the support is moved vertically upwards by any suitable means known per se until the lower face of the ice cream core is situated at a certain distance—depending on the required decoration—from the lower end of the lateral nozzles of the coating head whilst its upper face is situated below the upper nozzles of said head. On arriving in this position, the support is automatically locked therein, the command to stop the movement being obtained in known manner. The automatic stoppage of the support of the ice cream core results—through conventional means for controlling the start-up of the metering unit—in the passage of a predetermined quantity of meringue mix into the chamber 5 for receiving the product and extruding it through the nozzles 10 and 11 formed on the rectangular base 6 of said chamber. The position of the nozzles during extrusion is shown in dash-dot lines in FIG. 2. On completion of extrusion after a variable length of time, the downward movement of the platform carrying the product results in the formation of the decoration and then in the separation thereof from the extrusion nozzles. The extrusion nozzles occupy the position shown in solid lines relative to the platform at the end of its descent (cf. also FIG. 2).

It is obvious that the formation of a substantially homogeneous thickness of coating product depends on several factors and in particular upon the volume of product stored in the reservoir, the number and arrangement of the nozzles, the opening of their outlet orifices and the viscosity of the coating product. All these parameters are adjusted by trial and error according to the required result.

Although generally the same for all the nozzles of one and the same head, the shape of the lower outlet orifices for the coating product of the upper nozzles may also be different for some of them with a view to obtaining particular decorative effects. Similarly, in order to obtain on the coating of the lateral faces of the ice cream core a decoration which gives them a ribbed appearance, the whistle-shaped orifices of the peripheral nozzles may be given dimensions changing from one to the other, as shown for example in FIG. 3. In the example illustrated, two successive nozzles in one row have orifices of different dimensions although these orifices remain the same for every two nozzles. One nozzle out of two has an orifice resulting from the intersection of the lower end by an oblique plane which passes through a diameter of the circular base of the cylindrical tube from which it is formed, whilst one nozzle out of two has an orifice resulting from the intersection of its lower end by an oblique plane which passes through a chord of the circular base of the corresponding cylindrical tube, a smaller orifice opening corresponding to that intersection. Since the quantity of coating product extruded by the nozzles having the larger orifices is greater than that extruded by the adjacent nozzles having the smaller orifices, ribbings are formed on the lateral faces of the ice cream core, the corresponding ribs being disposed along vertical planes and thus decorating said faces.

As mentioned above, the coating head described in the foregoing forms part of an assembly completely automated by any suitable type of known mechanical and/or electromagnetic or electronic means, in which the ice cream cores supported by the insulating confectionery base are conveyed in prefabricated form onto the platform which, in line with the coating head, acts as a support for them and is moved into the interior of the rectangular chamber formed by the lines of peripheral nozzles and then displaced vertically downwards while the nozzles extrude the coating product.

A coating head of this type thus makes it possible to mechanise and automate a number of operations which, so far as the articles, particularly of confectionery, of parallelepipedic or pseudo-parallelepipedic shape are concerned, could hitherto be performed only manually—in part at least—and which could only be performed completely mechanically and/or automatically in the case of articles of circular shape, i.e. cylindrical, conical or frustoconical.

The invention has been described in the foregoing with reference to the preparation of a Baked Alaska and more particularly with reference to that phase of the preparation process in which the ice cream core is coated with a meringue mix. It may of course be applied to any article or product, particularly of confectionery, parallelepipedic of pseudo-parallelepipedic in shape, which is intended to be coated and/or covered with an aerated product of semi-fluid consistency, such as for example whipped cream or any other similar product.

In general terms, it is understood that the invention has only been described and illustrated by way of preferred example and that technical equivalents could be applied to its constituent elements without departing from the scope of the invention.

I claim:

1. Apparatus for simultaneously coating and decorating with an aerated product of semifluid consistency the upper face and the lateral faces of an article of confectionery said apparatus comprising a base having a downwardly-facing lower surface an array of upper decorating nozzles fixed to the base and extending downwardly from the lower surface thereof, each such upper decorating nozzle having a serrated outlet opening at its lower end, a plurality of lateral decorating nozzles fixed to the base and extending downwardly from the lower surface thereof at regular intervals along the periphery of said array of upper decorating nozzles, said lateral decorating nozzles extending downwardly beyond said upper decorating nozzles so that said lateral and upper nozzles cooperatively define a space bounded on its sides by said lateral decorating nozzles and on its top by said upper decorating nozzles, each of said lateral decorating nozzles having a lateral outlet opening directed inwards towards said space so that the openings of said upper and lateral decorating nozzles will confront the upper and lateral faces of an article disposed within said space said apparatus also comprising a support for the articles to be coated, means for moving said support and said base vertically relative to one another to advance an article into space and withdraw it therefrom and means for feeding said aerated product through said upper and lateral decorating nozzles simultaneously while an article to be decorated is disposed in said space to thereby simultaneously coat the upper and lateral faces of such article.

2. Apparatus as claimed in claim 1 adapted to coat and decorate an article which is pseudo-parallelepipedic in shape, said space being pseudo-parallelepipedic in shape.

3. Apparatus as claimed in claim 1 or 2, in which said base is fixed and said moving means includes means for moving said support.

4. Apparatus as claimed in claim 2 in which said space is generally in the form of a rectangular parallelepiped, said lateral decorating nozzles including four apex nozzles disposed at the apices of such parallelepiped, the lateral outlet opening of each such apex nozzle being inclined at 45° to each of the two adjacent sides of the rectangular parallelepiped.

5. Apparatus as claimed in claim 1, wherein the lateral outlet opening of each of said lateral decorating nozzles is bevelled in the form of a whistle.

6. Apparatus as claimed in claim 5, wherein the lateral outlet openings bevelled in the form of a whistle of each two successive lateral decorating nozzles have different dimensions.

7. A coating and decorating head as claimed in claim 1, wherein the lower ends of those of said upper decorating nozzles disposed adjacent the periphery of said array are lower than the lower ends of those of said upper decorating nozzles disposed adjacent the center of the array.

8. Apparatus as claimed in claim 1 in which said feeding means includes a hollow chamber, all of said upper and lateral decorating nozzles communicating with said chamber.

9. Apparatus as claimed in claim 8 in which said base constitutes a wall of said chamber.

* * * * *

UNITED STATES PATENT AND TRADEMARK OFFICE
CERTIFICATE OF CORRECTION

PATENT NO. : 4,368,684

DATED : January 18, 1983

INVENTOR(S) : Noel Launay

It is certified that error appears in the above—identified patent and that said Letters Patent is hereby corrected as shown below:

Column 1, line 21, "and" should read --the--.

Column 5, line 33, insert the word --the-- after the word "After".

column 7, line 38, insert the word --said-- after the word "into".

Signed and Sealed this

Twenty-second Day of March 1983

[SEAL]

Attest:

Attesting Officer

GERALD J. MOSSINGHOFF

Commissioner of Patents and Trademarks